(12) United States Patent
Deeds

(10) Patent No.: US 6,508,136 B1
(45) Date of Patent: Jan. 21, 2003

(54) HIGH OUTPUT DIFFERENTIAL PRESSURE FLOW SENSOR

(75) Inventor: Michael A. Deeds, Port Tobacco, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/012,614

(22) Filed: Dec. 13, 2001

(51) Int. Cl.[7] .................................................. G01F 1/37
(52) U.S. Cl. ...................................................... 73/861.52
(58) Field of Search .......................... 73/861.52, 861.65, 73/861.47, 718, 861.42

(56) References Cited

U.S. PATENT DOCUMENTS 5,438,880 A * 8/1995 Washburn ..................... 73/718
5,515,735 A * 5/1996 Sarihan ..................... 73/861.42

* cited by examiner

Primary Examiner—Max Noori
Assistant Examiner—Takisha Miller
(74) Attorney, Agent, or Firm—Mark Homer

(57) ABSTRACT

The invention comprises an improvement to the prior art differential pressure fluid flow meter described in U.S. Pat. No. 6,308,581. The prior art fluid flow meter includes a longitudinal recess angled to the surface of the vessel so as to form a ramp, and a dynamic port surface angled extending from the floor of the ramp to the surface. The dynamic port is formed in the dynamic port surface and is connected through a dynamic port channel to a pressure transponder. The improvement comprises combining the above described differential pressure fluid flow meter with a low pressure port, at an angle less than 90 degrees to the dynamic port, wherein fluid flow draws pressure from the low pressure port in a direction counter to fluid flow entering the dynamic port.

12 Claims, 2 Drawing Sheets

HIGH OUTPUT DIFFERENTIAL PRESSURE FLOW SENSOR

STATEMENT OF GOVERNMENT INTEREST

The invention described herein may be manufactured and used by or for the Government of the United States of America for governmental purposes without payment of any royalties thereon or therefor.

BACKGROUND OF THE INVENTION

1. Field Of The Invention

The present invention relates generally to devices for measuring fluid flow speed using differential pressure, specifically to devices measuring the speed of devices or vessels, and more specifically to devices for measuring the speed of low speed devices or vessels.

2. Description Of The Related Art

A commonly used device for the measurement of either air or water speed of vehicles is the pitot tube. A description of how the pitot tube operates as well as specific examples of other speed measurement devices that operate by sensing fluid pressure are set forth in U.S. Pat. No. 6,308,581, which is herein incorporated by reference.

The invention disclosed in U.S. Pat. No. 6,308,581 is a differential pressure flow sensor that alleviates many of the problems associated with previous speed measurement devices such as protrusion of the speed measurement device from the surface of the vessel directly into the fluid flow and wear and friction issues due to moving parts. The invention overcame these previous problems by providing a differential pressure flow meter that includes a longitudinal recess angled to the surface of the vessel so as to form a ramp, and a dynamic port surface angled extending from the floor of the ramp to the surface. A dynamic port is formed in the dynamic port surface and is connected through a dynamic port channel to a pressure transponder. Optionally, a static port, which is basically a port that is normal to the fluid flow, may be provided in the ramp or from the surface of the vessel. The static port may be connected through a static port channel to the pressure transponder which is used to determine the differential pressure between the static and dynamic ports. The pressure in the dynamic port channel or differential pressure between the dynamic port and the static port channels is related to the flow rate of fluid across the surface of the vessel.

The above described differential pressure flow sensor operates far more precisely than previous prior art measuring devices for vehicles travelling at high speeds. However, for vehicles travelling at very low speeds (below 5 knots), the above sensor may be less accurate due to the smaller change in differential pressure between the dynamic and static port channels as well as vessel heaving causing dynamic flow into the static port (which is insignificant at higher speeds).

Therefore, a differential pressure flow sensor is desired that performs more accurately at lower speeds.

SUMMARY OF THE INVENTION

The invention consists of an improvement to the invention disclosed in U.S. Pat. No. 6,308,581 to improve the accuracy of measurements at low speeds. The improvement uses the concept of forgoing depth measurement using a static port to increase differential pressure through use of a low pressure port, at an angle less than 90 degrees to the dynamic port, wherein fluid flow draws pressure from the low pressure port in a direction counter to fluid flow entering the dynamic port. By using this concept, the device accuracy is improved at low speeds, however, for higher speed applications, the prior art device may still provide more accurate measurements.

Accordingly, it is an object of this invention to provide an improved fluid flow sensor for low speed applications.

It is a further object of this invention to provide an improved fluid flow sensor for flow speedometer on a vessel for low speed applications.

It is a still further object of this invention to provide a higher output differential flow pressure flow sensor for low speed applications.

It is yet a further object of this invention to provide a more precise flow sensor for low speed devices or vessels.

This invention accomplishes these objectives and other needs related to measuring fluid flow speed using differential pressure by providing an improvement upon the differential pressure flow sensor of U.S. Pat. No. 6,308,581 that provides a larger pressure differential for a given flow, and, thereby allows a more precise measurement of flow for low speed devices or vessels. The improved differential pressure flow sensor comprises an improvement to the prior art differential pressure fluid flow meter described in U.S. Pat. No. 6,308,581 for low speed applications. The prior art fluid flow meter includes a longitudinal recess angled to the surface of the vessel so as to form a ramp, and a dynamic port surface angled extending from the floor of the ramp to the surface. The dynamic port is formed in the dynamic port surface and is connected through a dynamic port channel to a pressure transponder. The improvement comprises combining the above described differential pressure fluid flow meter with a low pressure port, at an angle less than 90 degrees to the dynamic port, wherein fluid flow draws pressure from the low pressure port in a direction counter to fluid flow entering the dynamic port.

BRIEF DESCRIPTION OF THE DRAWINGS

The accompanying drawings, which are incorporated in and constitute a part of the specification, illustrate embodiments of the invention, and, together with the description, serve to explain the principles of the invention.

DESCRIPTION OF THE PREFERRED EMBODIMENT

The invention, as embodied herein, comprises an improvement to a prior art differential pressure flow sensor disclosed in U.S. Pat. No. 6,308,581. During testing of the prior art invention, it was found that the precision of the sensor tended to decrease when used at speeds less than 5 knots and particularly at speeds less than 1 knot. The present invention overcomes this problem by using the background pressure in the flow field; a low pressure port is created, counter to the dynamic pressure port, from which additional pressure is drawn. This requires that one forego depth measurement provided by an optional static port, but significantly increases the differential pressure output. This is accomplished because the flow draws pressure from this low pressure port due to its orientation being counter to that of the flow and counter to the dynamic pressure port. In general, the present invention comprises an improvement of the prior art differential pressure flow sensor disclosed in U.S. Pat. No. 6,308,581 for low speed applications by taking that sensor and, rather than installing a static port to obtain depth measurement information, installing a low pressure port, at an angle less than 90 degrees to the dynamic port, wherein fluid flow draws pressure from the low pressure port because the fluid flows in a direction counter to fluid flow entering the dynamic port.

Figure 4:
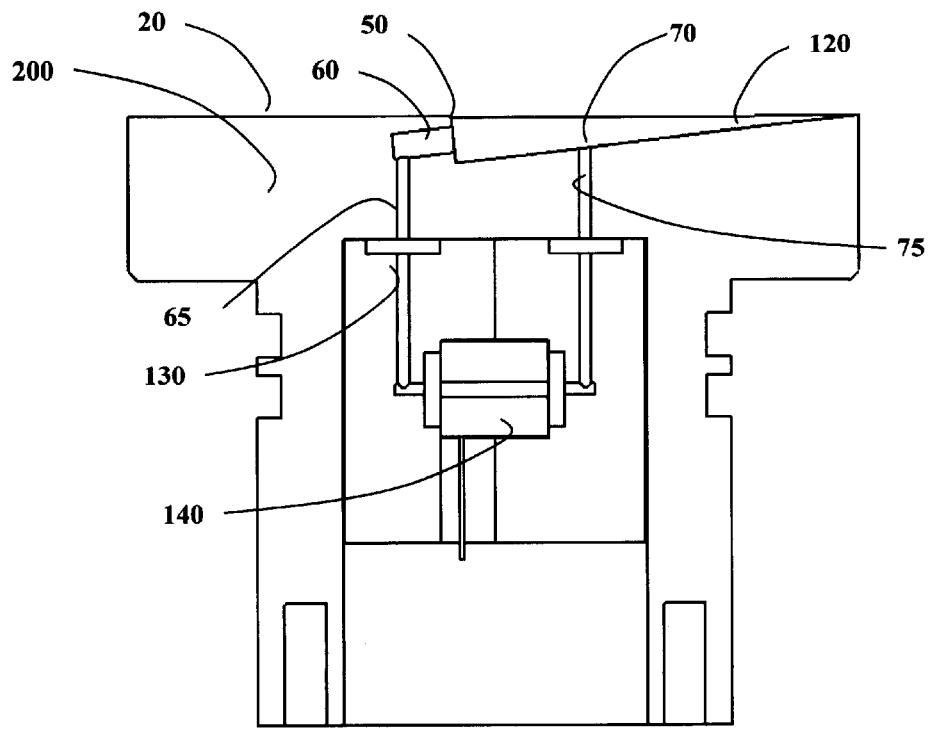
FIG. 4 is a cross sectional view of an embodiment of the prior art invention to which the present invention comprises an improvement thereto.

The prior art differential pressure flow sensor may be either integral to a vessel or installed within a separate unit that can be installed into a vessel. FIG. 4 shows a view of the latter type of embodiment of the prior art invention to which the present invention comprises an improvement thereto. Flow meter 200 can be seen to be of general cylindrical shape and the housing of the flow meter is installed in a complementary hole formed in the surface of a vessel (not shown). Top surface 20 of flow meter 200 is curved to match the curvature of the surface of the vessel and is flush when flow meter 200 is installed. Flow meter 200 has a recess including a ramp 120, dynamic pressure port surface 50, and dynamic port 60, which are more fully described in U.S. Pat. No. 6,308,581. The dynamic port channel 65 is connected through seal 130 to mechanical or electronic pressure transducer 140, which may be a micromachined diaphragm with embedded piezoresistive sensing elements. Static port 70 and static port channel 75 are also shown, however, the improvement to this invention does not include these elements as discussed further below.

Figure 1:
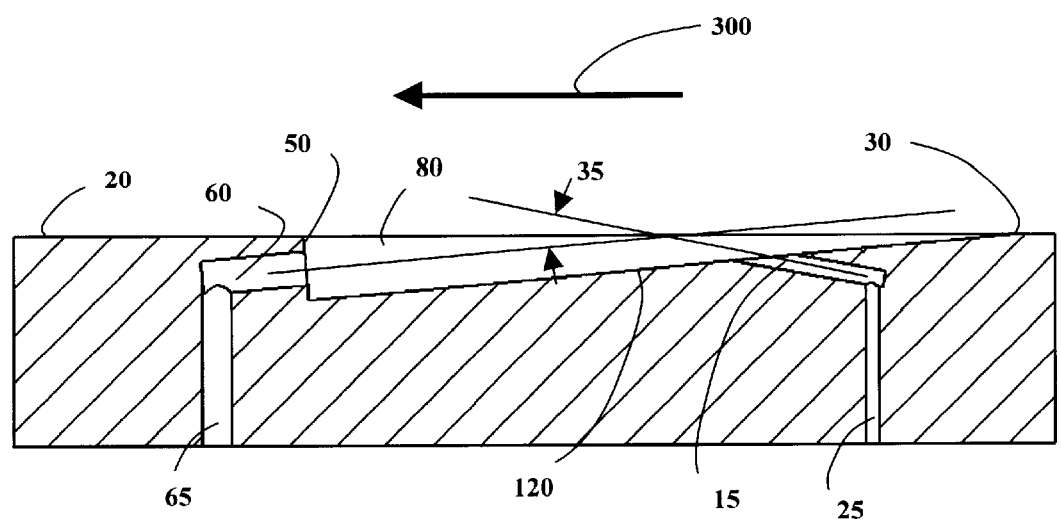
FIG. 1 is a cut away view of an embodiment of the invention showing the low pressure port at an angle to the dynamic port.

Referring to FIG. 1, the invention comprises an improvement to the differential pressure flow meter described above. FIG. 1 shows a cut away through the center of ramp 120. The device is installed in a region of the surface of a vessel or device as is more fully described in U.S. Pat. No. 6,308.581. The approximate fluid flow across the device is shown by arrow 300. The device includes a recess formed in the surface 20. The recess begins at leading edge 30 and is defined in this embodiment by walls 80, ramp 120, and dynamic port surface 50. Thus, the ramp extends from the surface 20 and is inclined to form the recess. Dynamic port surface 50 extends from the lower end of the ramp approximately to the surface 20. The walls 80 in the embodiment shown are in a curved or cylindrical shape to allow fluid to flow more easily into the dynamic port 60, but the ramp may be shaped in any configuration that assists the fluid to flow into the dynamic port. The dynamic port 60 is formed on the dynamic port surface 50 with a dynamic port channel 65 attached to the dynamic port, which in turn is normally connected to a mechanical or electronic pressure transducer (see FIG. 4). Again referring to FIG. 1, the improvement comprises a low pressure port 15 formed in the device that accepts-fluid flow counter to the flow 300. As long as the low pressure port 15 is oriented so that the fluid flow is counter to the low pressure port 15, and, thereby, draws pressure, it may be formed in the surface 20, the ramp 120, or a second ramp (as discussed further below). The low pressure port 15 is connected to a low pressure port channel 25, which would also normally be connected to a mechanical or electronic pressure transducer. In this embodiment, the low pressure port 15, formed in the ramp 120 opposite to the dynamic port 60, is at an angle 35 to the dynamic port 60. This angle 35 can be determined by one skilled in the art as long as the angle does not create a static port (approximately 90 degrees), so one obtains flow counter to the dynamic port 60. One preferred angle 35 is about 0 degrees to about 30 degrees. A more preferred embodiment of the invention (discussed further below) comprises an angle 35 of approximately 0 degrees, making the low pressure port 15 approximately parallel to the dynamic port 60. By configuring the low pressure port 15 to accept flow counter to the dynamic port 60, the flow draws pressure from the low pressure port, which allows a greater pressure differential between the two ports. At lower speeds, this allows a more precise measurement of the speed. For the purposes of this application, the drawing of pressure discussed above refers to creating pressures that are lower than the local pressure field surrounding the device. Therefore, if the local pressure field around the device is 45 psi (assuming the device is submerged at a certain level under water), the dynamic port 60 would register a pressure greater than 45 psi and the low pressure port 15 will register a pressure below 45 psi.

Figure 2:
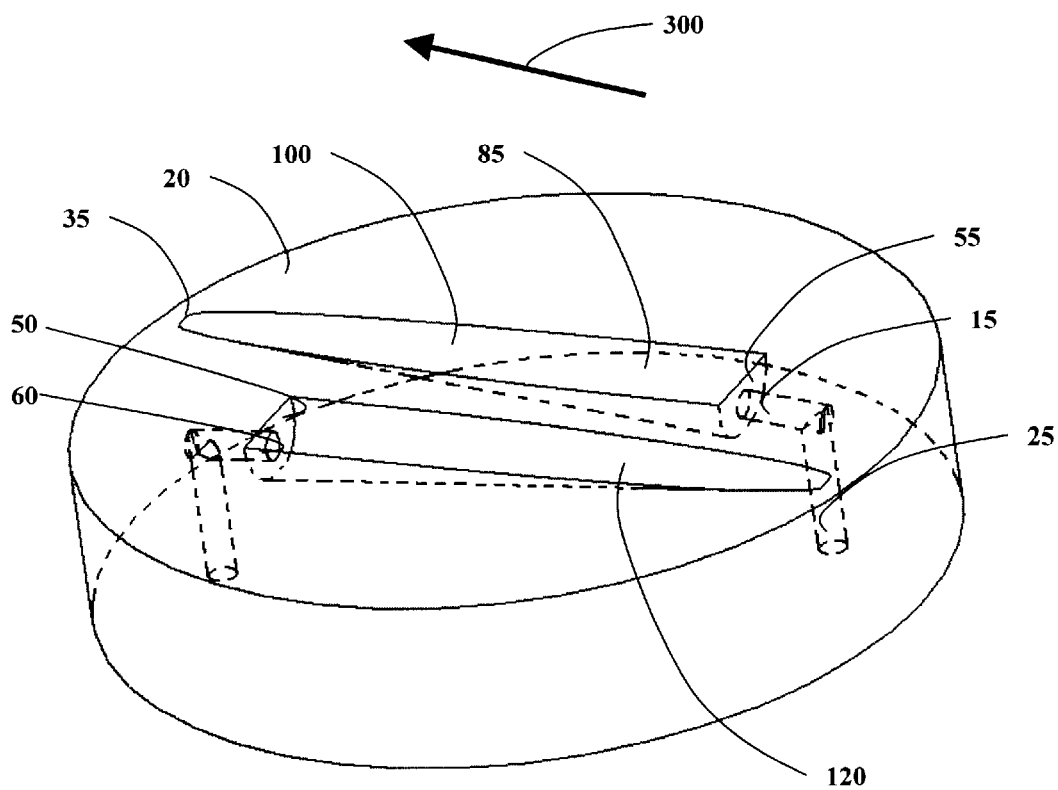
FIG. 2 is transparent line view of an embodiment of the invention showing the low pressure port formed in a second ramp and substantially parallel to the dynamic port.

FIG. 2 shows a second embodiment of the invention that shows two ramps 120 and 100. Ramp 120 is essentially the same as the ramp 120 set forth in FIG. 1 where the dynamic port 60 is formed within the dynamic port surface 50. Second ramp 100 also forms a recess in the surface 20. The recess begins at leading edge 35 and is defined in this embodiment by walls 85, second ramp 100, and low pressure port surface 55. Low pressure port 15 is formed in low pressure port surface 55 and is connected to low pressure port channel 25. Physically, the second ramp 100, walls 85, low pressure port surface 55, low pressure port 15, and low pressure port channel. 25 may be configured substantially identical to the ramp 120/dynamic port 60 system described above, except that the configuration of ramp 100 should allow the counter flow to draw pressure from low pressure port 15. Again, in a preferred embodiment of the invention, the ramp 120 and second ramp 100 may be oriented at an angle of from about 0 degrees to about 35 degrees from one another so that the dynamic port 60 and low pressure port 15 are at the substantially same angle from one another. In a more preferred embodiment, the ramps 120, 100 are approximately parallel to one another.

Figure 3:
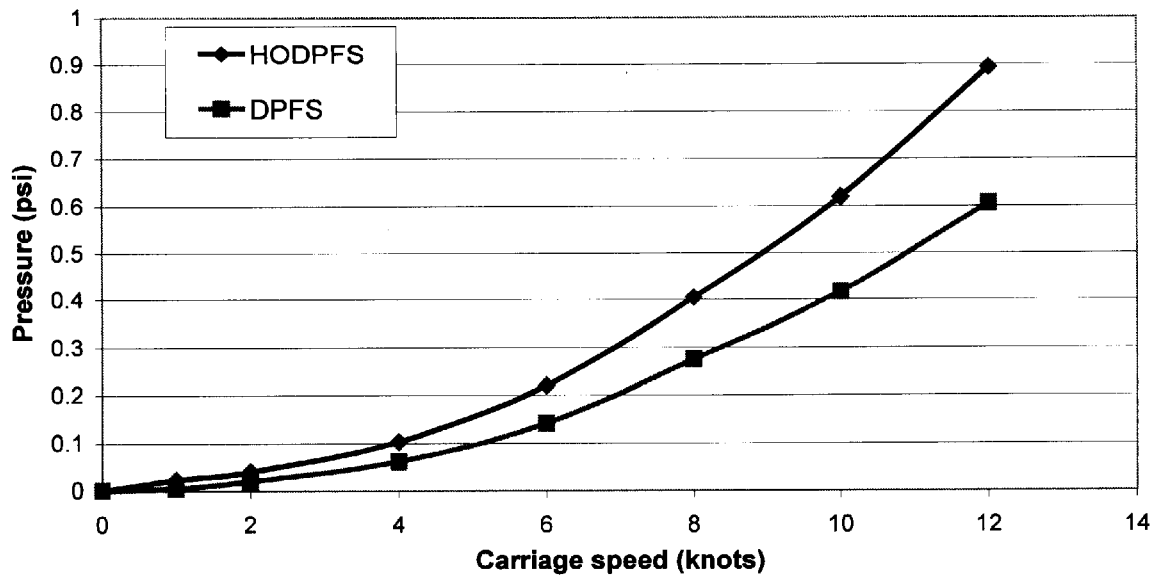
FIG. 3 is a graph showing the increase in pressure versus the vehicle speed of the prior art sensor versus the present improved sensor for low speeds.

FIG. 3 shows performance data in tests run on the prior art differential pressure flow sensor (DPFS) of U.S. Pat. No. 6,308,581 and the improved sensor of the present invention set forth as a High Output Differential Pressure Flow Sensor (HODPFS). As can be seen, the differential pressure output of the present invention increases more than 100 percent between 0–2 knots and increases between 48–66 percent from 2–12 knots. This data shows that for lower speed usage, the present invention substantially increases the sensitivity over the prior art invention.

The present invention also includes a method of measuring fluid flow velocity above a boundary layer and across a surface of an object. First, one must provide a ramp connected to a surface of an object exposed to fluid flow inclined to the surface so as to form a recess. Next a dynamic port member having a surface extending from the recessed end of the ramp an angle comprising less than about 180 degrees between the ramp and the surface is provided. Also, a low pressure port, at an angle less than 90 degrees to the dynamic port is provided, wherein fluid flow draws pressure from the low pressure port due to the counter direction of fluid flow. One then must determine a calibration of the differential pressure between the dynamic port and the low pressure port as a function of know fluid flow velocity and interpolate the value of an unknown fluid velocity from the calibration of the differential pressure. In preferred embodiments of this method, the angle between the dynamic port and low pressure port comprises from about 0 degrees to about 30 degrees or more preferably, the low pressure port comprises an approximately parallel position in relation to the dynamic port.

What is described are specific examples of many possible variations on the same invention and are not intended in a limiting sense. The claimed invention can be practiced using other variations not specifically described above.

What is claimed is:

1. In combination with a fluid flow meter in the surface of a vessel comprising a ramp connected to and extending longitudinally from a surface of a vessel exposed to fluid flow at a first end of the ramp to an opposite end of the ramp, said ramp inclined at a first angle to the surface to form a recess in the surface of the vessel, a port member having a surface extending from said opposite end of the ramp, said port surface being oriented at a second angle comprising less than about 180 degrees between said ramp and said surface, said surface having a dynamic port formed therein, the axis of said dynamic port oriented approximately parallel to said ramp, and a pressure measurement device connected to the dynamic port, for measuring the dynamic pressure caused by a flow of fluid in a direction roughly parallel to the surface of the vessel exposed to fluid flow, the improvement comprising:

a low pressure port connected to the pressure measurement device, formed in the fluid flow meter at a third angle to the surface, oriented at a fourth angle comprising less than 90 degrees to the dynamic port, for measuring pressure less than local pressure around the fluid flow meter caused by fluid flow in a direction counter to the third angle.

2. The improved fluid flow meter of claim 1, wherein the low pressure port is formed within the ramp.

3. The improved fluid flow meter of claim 2, wherein the fourth angle between the dynamic port and the low pressure port comprises from about 0 degrees to about 30 degrees.

4. The improved fluid flow meter of claim 3 wherein the low pressure port comprises an approximately parallel position in relation to the dynamic port.

5. In combination with a fluid flow meter in the surface of a vessel comprising a ramp connected to and extending longitudinally from a surface of a vessel exposed to fluid flow at a first end of the ramp to an opposite end of the ramp, said ramp inclined at a first angle to the surface to form a recess in the surface of the vessel, a port member having a surface extending from said opposite end of the ramp, said port surface being oriented at a second angle comprising less than about 180 degrees between said ramp and said surface, said surface having a dynamic port formed therein, the axis of said dynamic port oriented approximately parallel to said ramp, and a pressure measurement device connected to the dynamic port, for measuring the dynamic pressure caused by a flow of fluid in a direction roughly parallel to the surface of the vessel exposed to fluid flow, the improvement comprising:

a second ramp, oriented at a third angle comprising less than 90 degrees from the ramp, connected to and extending longitudinally from the surface of the vessel exposed to fluid flow at a front end of the second ramp to a rear end of the second ramp, the second ramp inclined at a fourth angle to the surface to form a recess in the surface of the vessel, a low pressure port surface, inclined at a fifth angle, comprising less than 180 degrees between the second ramp and the surface having a low pressure port formed therein having an axis of the low pressure port oriented approximately parallel to the second ramp for measuring pressure less than local ambient pressure around the fluid flow meter.

6. The improved fluid flow meter of claim 5, wherein the third angle comprises from about 0 degrees to about 30 degrees.

7. The improved fluid flow meter of claim 6, wherein the ramp and the second ramp comprise an approximately parallel position to one another.

8. The improved fluid flow meter of claim 6, wherein the ramp and the second ramp comprise approximately cylindrical shapes.

9. The improved fluid flow meter of claim 8, wherein the pressure measurement device comprises a micromachined diaphragm with embedded piezoresistive sensing elements.

10. A method of measuring fluid flow velocity above a boundary layer and across a surface of an object, comprising the steps of:

providing a ramp connected to a surface of an object exposed to fluid flow inclined to the surface so as to form a recess;

providing a dynamic port member having a surface extending from the recessed end of the ramp an angle comprising less than about 180 degrees between the ramp and the surface;

providing a low pressure port, at an angle less than 90 degrees to the dynamic port, wherein fluid flow draws pressure from the low pressure port;

determining a calibration of the differential pressure between the dynamic port and the low pressure port as a function of know fluid flow velocity; and, interpolating the value of an unknown fluid flow velocity from the calibration of the differential pressure.

11. The method of claim 10, wherein the angle between the dynamic port and the low pressure port comprises from about 0 degrees to about 30 degrees.

12. The method of claim 11, wherein the low pressure port comprises an approximately parallel position in relation to the dynamic port.

* * * * *